O. H. P. LITTLE & F. J. HUEBER.
Furnace Grate.
No. 166,391. Patented Aug. 3, 1875.
FIG I
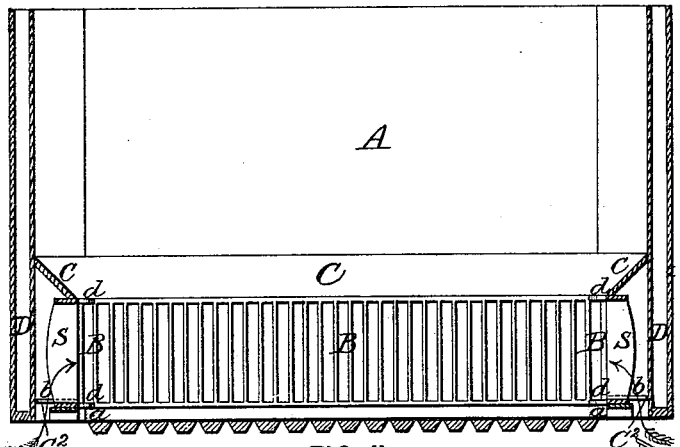
FIG II
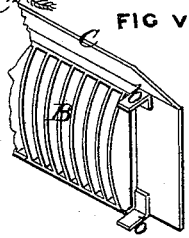
FIG V
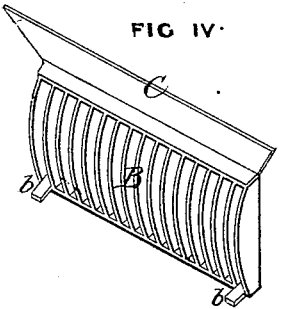
FIG IV
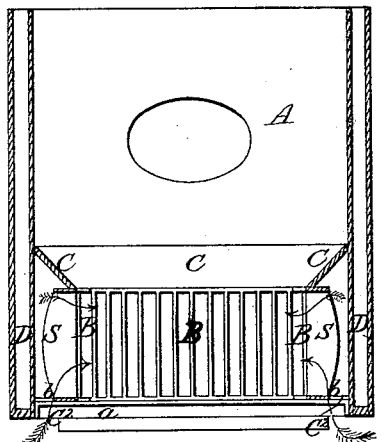
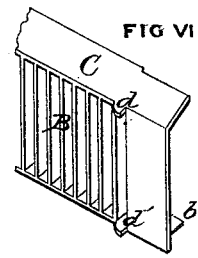
FIG VI
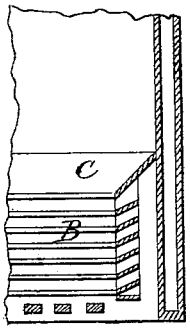
FIG VII
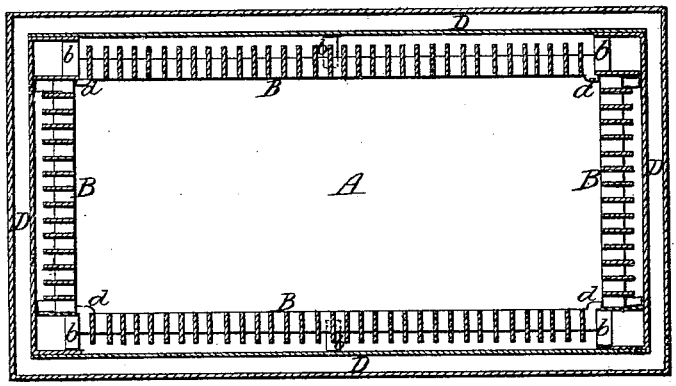
FIG III
WITNESSES
John E. Laing
J. A. Rutherford
INVENTORS
Oliver H. P. Little
Francis J. Hueber
By Johnson & Johnson
their Attys.
N. PETERS, PHOTO-LITHOGRAPHER, WASHINGTON, D. C.

UNITED STATES PATENT OFFICE.

OLIVER H. P. LITTLE AND FRANCIS J. HUEBER, OF INDIANAPOLIS, INDIANA.

IMPROVEMENT IN FURNACE-GRATES.

Specification forming part of Letters Patent No. 166,391, dated August 3, 1875; application filed May 18, 1875.

*To all whom it may concern:*

Be it known that we, OLIVER H. P. LITTLE and FRANCIS J. HUEBER, of Indianapolis, in the county of Marion and State of Indiana, have invented certain new and useful Improvements in Fire-Boxes for Coal-Burning Furnaces; and we do hereby declare that the following is a full, clear, and exact description thereof, which will enable others skilled in the art to which it pertains to make and use the same, reference being had to the accompanying drawing, and to the letters of reference marked thereon, which form a part of this specification.

Our object is to improve the grate or fire-wall attachment for steam-boilers, to allow such wall attachment to be readily applied to any furnace, and be more durable and cheaper than those heretofore proposed. A grated wall for a fire-box grate has been used, and in which such walls are composed of separate short grate-bars strung at their lower ends upon horizontal rods arranged round the furnace and suspended beneath the grate, and with their upper ends resting against the furnace-wall and covered by a separate top perforated ledge, so that a space is obtained behind the grate-wall for the passage of air through the sides and top plate thereof. Being strung upon the rods, the lower ends of the strung bars are thus maintained in relative position with the grate-bars. We have a more simple plan for a grate-wall, which consists of separate grate-sections, equal in length and width to the box, and constructed and fitted at their corners, so that when the sides are slid vertically in position upon the cross-bars the end frames are slid in between the ends of the side sections, and thus secure each other in position, and allow either side to be removed from between the others and replaced when required, the ends of each intermatching by their miter angles, and forming a durable removable grate-wall. Each side section has lug projections extending from their lower edges, both against the furnace-walls and toward the center of the grate, and these are so arranged that they serve to support the grate-walls upon the bottom bars, to brace them against the furnace-walls, and to lock them with each other in position at their joining corners, both at top and bottom. These simple lug projections hold the grate-sections as a single structure, and allow it to be taken to pieces and put together without difficulty and in a short time, which is a matter of very great advantage in furnace-grates.

In the accompanying drawings, Figure 1 is a longitudinal sectional view of a fire-box having our invention applied thereto. Fig. 2 is a transverse section of the same; Fig. 3, a horizontal section; and Figs. 4, 5, 6, and 7, details of the grate-walls.

In the drawings, letter A may represent the fire-box of a coal-burning furnace, such as that of a locomotive, marine, portable, stationary, or other boiler. Around the sides and ends of the interior of the fire-box are arranged vertical grates or fire-walls B, which are made of a suitable height to extend above or at or about the top level of the fuel-bed. The lower ends of the vertical grated or fire-walls, which may also be termed slatted frames, are open at $C^2$, and rest upon the bottom bars $a$ of the fire-box, which usually support the grate. Each vertical grated or fire wall is provided with a flaring or oblique top rim or plate, C, which is made solid or unperforated, and has its upper edge turned in contact with the wall of the fire-box. When the vertical grated or fire walls are fitted around the fire-box, a space, S, open at the bottom $C^2$, is left between the grate-walls and the fire-box walls, this space being produced by the top rims C and the projecting lugs or studs $b$ on the grate-walls, which also serve to hold the latter away from the walls of the fire-box. The space S between the vertical grate-walls and fire-box walls is designed to permit air to pass upwardly from the bottom of the fire-box, and to pass into and circulate through the fuel-bed at every side of the same through the openings $C^2$, as shown by dotted lines in Fig. 2. The air or oxygen will readily pass through the spaces or openings in the grate-walls and come in contact with the burning fuel, for aiding and facilitating the combustion of the same, and of the escaping gases. The outwardly-turned top rim will prevent the air from passing between the rim and fire-box wall at the top, as the ascending currents of air are necessarily deflected or turned inwardly by said rim against the fuel. In addition to the beneficial effect upon the combustion of the fuel, the free admission of air to the sides of the same will prevent the formation of clinkers, and also protect the inner walls of the fire-box or boiler from being so rapidly burned out by the excessive heat. The latter result is mainly due to the fact that the fuel is removed from direct contact with the fire-box proper or base D of the boiler, which is most liable to be burned by the presence of sedimentary matter in the same. The bottom or ordinary grate may be made in any preferred manner, and either the stationary, rocking, or finger grate-bars may be resorted to, but the same should not extend beyond the lower end of the vertical grate-walls, as it would obstruct the free passage of the air upward behind them. The entire series of vertical grate-walls are locked together, so as to obviate displacement, and for this purpose lugs or projections $d$ are made near the ends of the side grate-walls, behind which the end grates are slipped. The bars of the grated or fire walls may be arranged horizontally, like the caps C, but in whatever manner, it should be to avoid being clogged with ashes and to give a free wall-space. The end sections slide between the side sections, and the cap-plates are overlapped or joined in any suitable manner, whereby the grated or fire walls can be easily put in and removed from the fire-box. The barred surfaces of the fire-walls, while allowing the free entrance of the air to the fire, also allow the ashes to pass readily through the walls into the spaces S, and through the opening $C^2$ below the grate.

We claim—

1. A supplemental fire-wall for protecting the water-legs of boiler-furnaces, consisting of two side and two end sections, B, equal in length and width to the fire-box, each having vertical grate-faces and an angular cap, C, with miter ends, and placed vertically in position to interlock and form a single structure, with the caps resting against the water-legs, and the sections upon base-bars, whereby any one of the sections B may be withdrawn and replaced without disturbing the others or the grate, as described.

2. The combination, with the grate-wall sections B, having angular intermatching ends and closed caps, of the lug projections $b$, extending from their lower edges against the furnace-wall, and the lug projections $d$ at the ends of the side walls, whereby the grate-frames are supported in place upon the bottom bars $a$, braced against the furnace-wall, and locked in position with each other at their joining corners, both at top and bottom, as herein set forth.

3. The vertical wall-sections B, having closed caps C integral therewith, and made angular at the ends, as and for the purpose set forth.

In testimony that we claim the foregoing as our own we have affixed our signatures in presence of two witnesses.

OLIVER H. P. LITTLE.
FRANCIS J. HUEBER.

Witnesses:
ISHAM HUGHES,
EDMUND J. LEONARD.